June 30, 1931. M. G. HILPERT 1,811,930
TURNTABLE OR TRANSFER TABLE AND TRUCK CONSTRUCTION THEREFOR
Filed Jan. 5, 1929 3 Sheets-Sheet 1
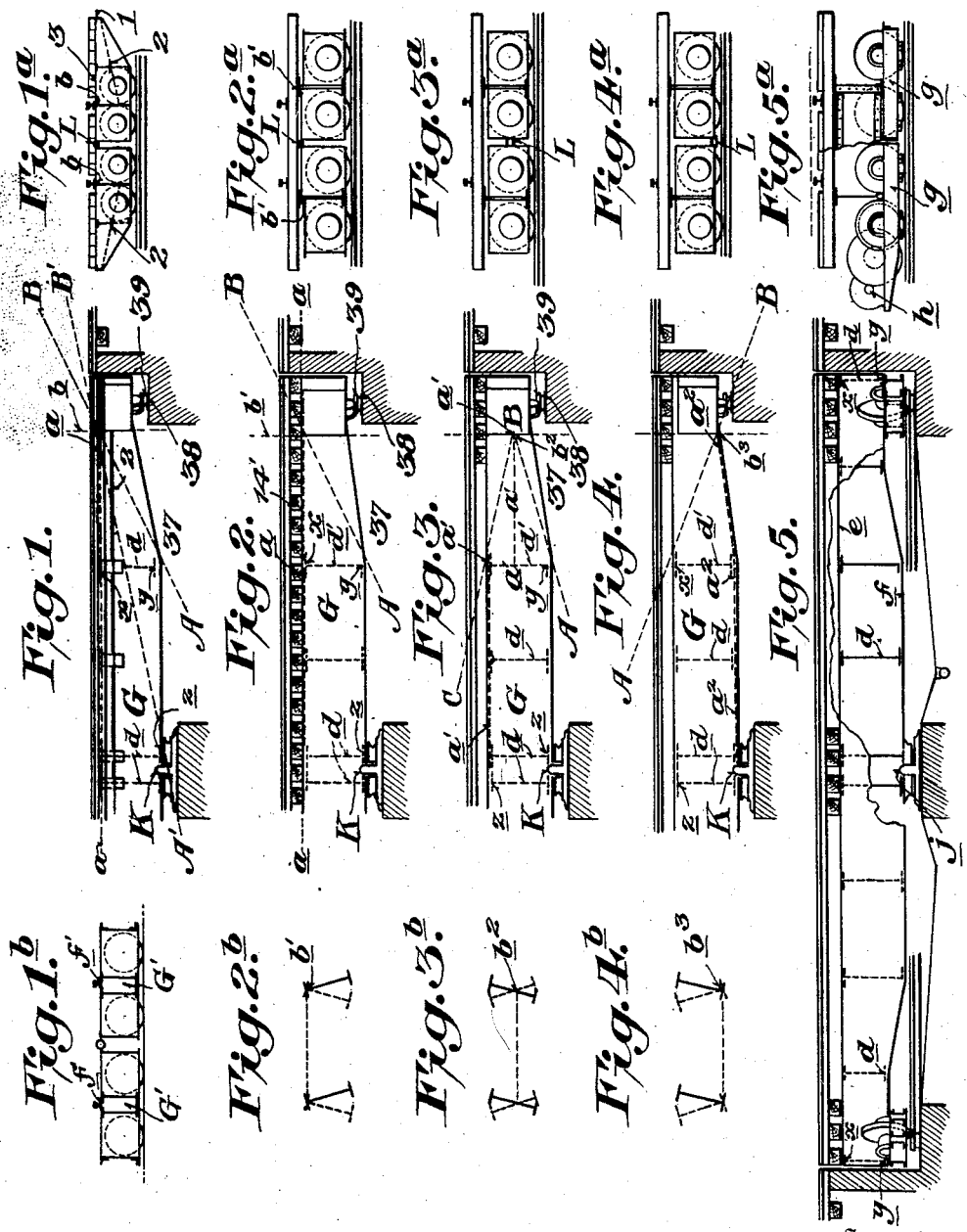

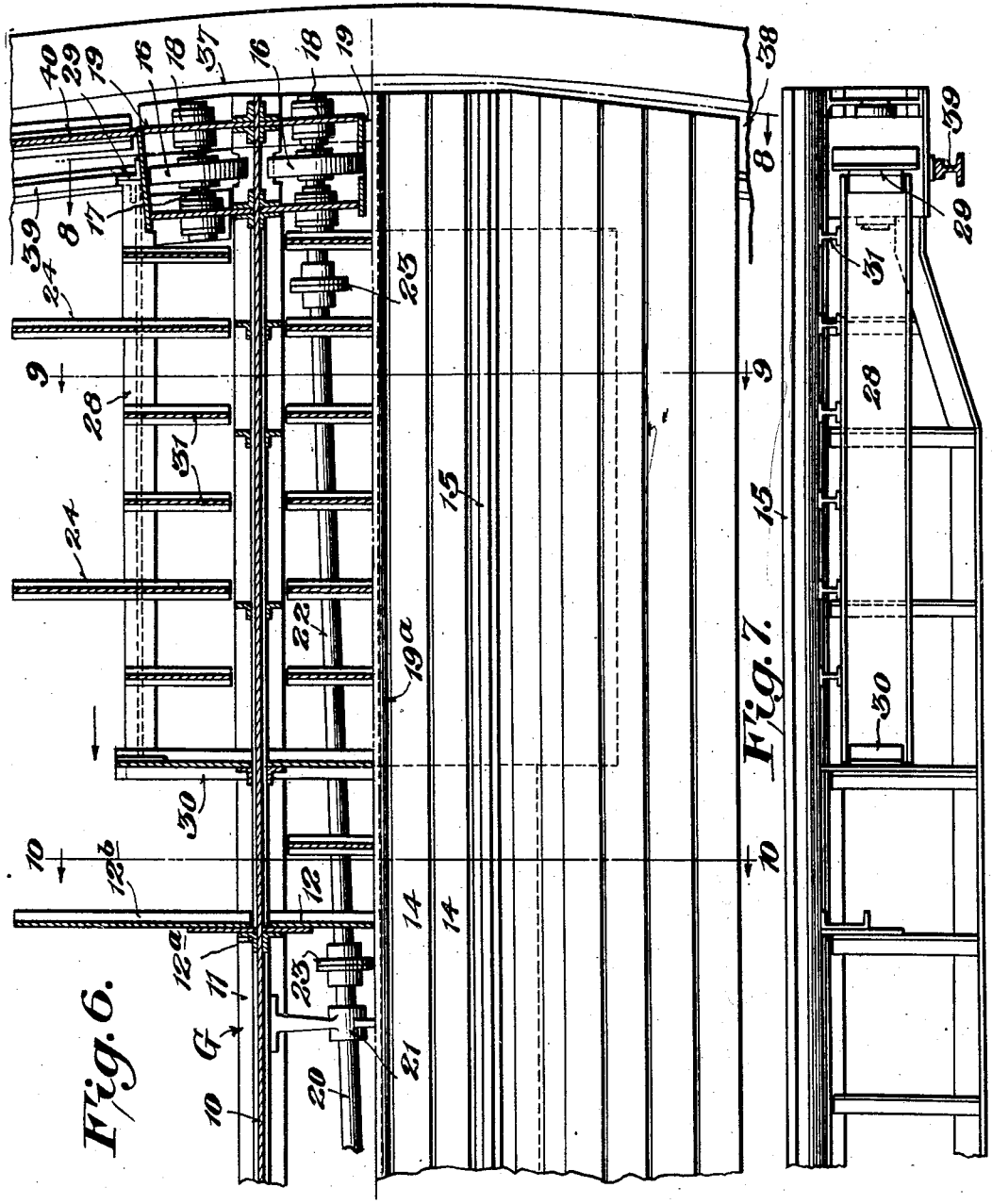

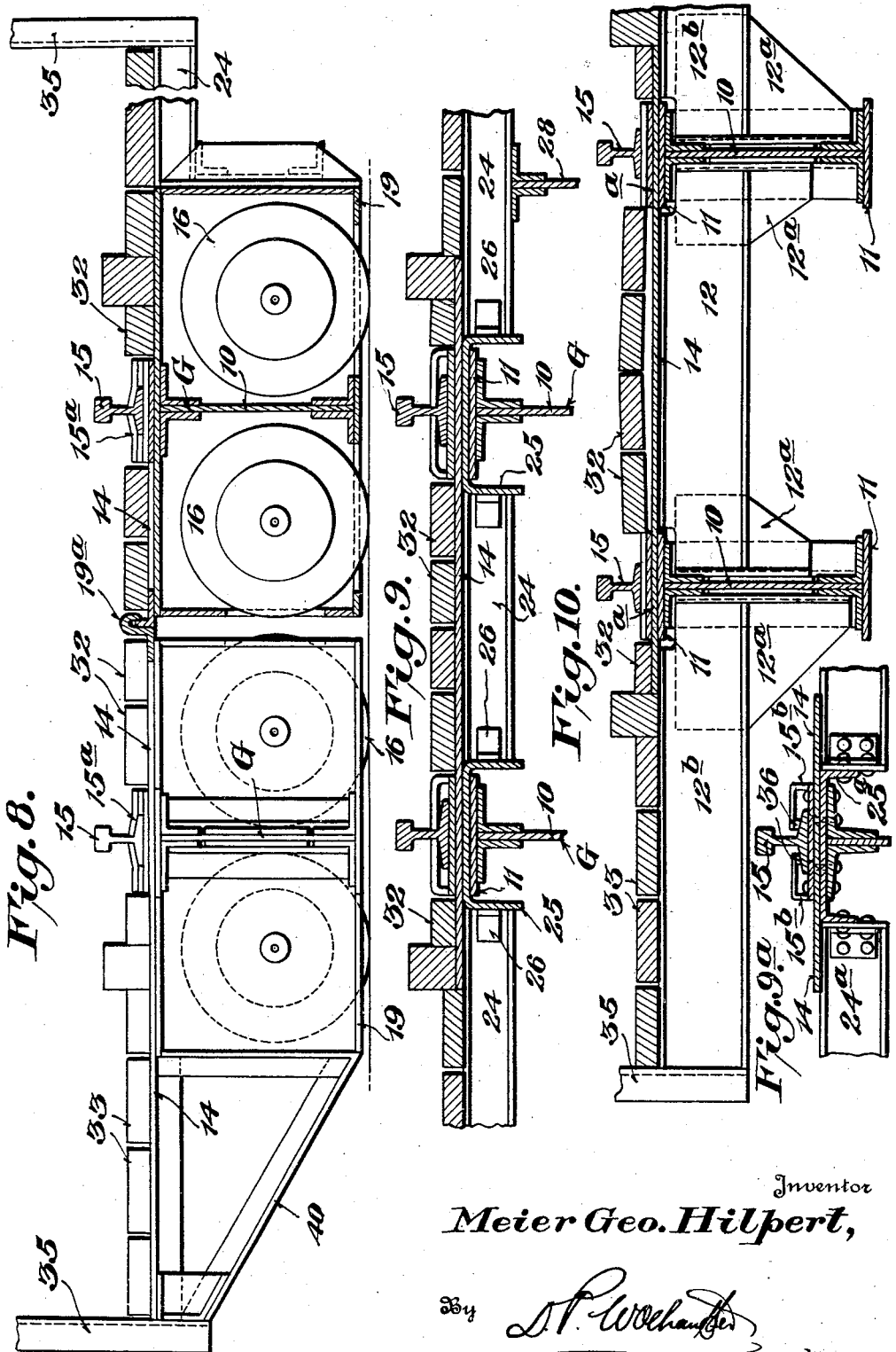

Patented June 30, 1931

1,811,930

UNITED STATES PATENT OFFICE

MEIER G. HILPERT, OF BETHLEHEM, PENNSYLVANIA

TURNTABLE OR TRANSFER TABLE AND TRUCK CONSTRUCTION THEREFOR

Application filed January 5, 1929. Serial No. 330,673.

This invention relates to an improvement in cranes, turn-tables or the like, and more particularly to a novel truck mounting.

To that end, the invention contemplates a construction wherein the ends of the load carrying girders are free to flex in such a manner as to insure the placing of equal loads on each wheel of a load carrying two-wheeled truck construction rigidly attached to the ends of each of the load carrying members. In that connection, it is proposed to provide a construction wherein the main girders are so braced that although they are rigid longitudinally and rigid for the depths required, the bracing is made to determine at the desired points, an axis of flexure, as well as the limits of flexure in the ends of the main girders. This construction also contemplates rigidly attaching two-wheeled truck frames, that is, truck wheels in tandem, to the ends of each main girder so that as the wheels follow the inequalities of the rail their frames will flex the end of the girder about its axis of flexure and thus equalize the girders loads to said rail.

Another object of the invention is to provide a box and two-wheeled and axle truck so that it may be easily assembled, exactly alined and then made rigid or integral with the girder by welding so that subsequently the bearings, wheels, and axles as well as the side frames, top plates or bottom plates may be easily assembled with all features of alinement retained, the said side frames, wheels, axles, bearings, boxes, etc., being interchangeable.

A further object of the invention is to provide a construction wherein the plate deck covers both of the load carrying members or girders. This novel arrangement permits of the elimination of wooden ties since the rails of the turntable or transfer table may be mounted directly on and over the girders; cheapens and shallows up the table pit; and also makes a positive protection for all construction below the deck plate. In addition to providing these advantages the top plate or deck forms a derailing platform so that if the table is not set exactly right and an engine truck drops off the rails onto the table deck, it will be supported first by the wheel boxes which are stable, and secondly, by side stringers which form a part of the platform. This latter construction; namely, that involving the use of side stringers is only necessary when the usual cross-tie deck is eliminated.

A still further object of the invention is to provide motivating means for cranes, turntables, or the like, of the above referred to character wherein a prime mover is employed and is located on the non-flexible intermediate portion of the unit and is connected to the unit supporting wheels at either or both ends of the unit through shafting including flexible joints which will take care of relative flexing of the load carrying members or girders with respect to the said non-flexing portion of the unit.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a detail diagrammatic side elevation, illustrating the preferred form of the invention.

Figure 1ª is a diagrammatic end elevation of the construction shown in Fig. 1.

Figure 1ᵇ is a diagrammatic end view of a truck construction for a bridge crane wherein the main girders are box girders and require no staying transversely.

Figure 2 is a detail diagrammatic side elevation showing a construction similar to Fig. 1, except that the top plate is not used and the usual cross-tie deck is employed.

Figure 2ª is a diagrammatic end elevation of the construction shown in Fig. 2.

Figure 2ᵇ is a diagrammatic view illustrating the manner in which the end sections of the main girders flex, the line of bracing in this instance being at the tops of the girders.

Figures 3, 3ª and 3ᵇ are respectively a detail diagrammatic side elevation, end elevation, and diagram of the manner in which the ends of the girders flex where the top bracing is dropped to a mid-point of the girder, thus lowering the axis of flexure.

Figures 4, 4ª and 4ᵇ are views similar to Figs. 3, 3ª and 3ᵇ wherein the bracing is located at the bottom of the girders so that the trucks cause the main girders to flex about the bottom flange line of the girders.

Figures 5 and 5ª are respectively diagrammatic side and end elevations, partly in section of a prior type of turntable.

Figure 6 is a top plan view partly in section illustrating the construction of the table.

Figure 7 is an enlarged detail side elevation of the construction shown in Fig. 1.

Figure 8 is a detail vertical sectional view taken on the line 8—8 of Fig. 6.

Figure 9 is a detail vertical cross-sectional view taken on the line 9—9 of Fig. 6.

Figure 9ª is a detail vertical sectional view illustrating a modified form of girder and rail mounting over that shown in Fig. 9.

Figure 10 is a vertical cross-sectional view taken on the line 10—10 of Fig. 6.

Similar reference characters designate corresponding parts throughout the several figures of the drawings.

As previously indicated the primary feature of the present invention resides in the idea of providing a turntable or transfer table having the ends of the webs of the girders which carry the trucks adapted to flex about a predetermined line or axis of flexure which may be determined by the bracing at the ends of the girders.

Accordingly, as will be observed from Fig. 1 of the drawings the line $a$—$a$—$a$ represents a top plate extending the full length of the table from truck to truck supplying a plane of rigid top bracing from girder to girder which construction of itself would allow of the two wheeled end trucks equalizing their loads by flexing the girders at their connections to said bracing along line $a$—$a$—$a$. This primary construction is that proposed for transfer tables running on parallel rails and is set forth in end view, Fig. 1ª where the lines of flexure $b$ and $b$ are horizontal lines running the full length of the table. Four truck, that is, eight wheeled bridge cranes (see end view Fig. 1ᵇ) may thus equalize their loads to the rails in an exactly similar manner on lines $f$ and $f$. For the bridge crane similar top bracing, but at the ends only, normally aligns and holds the girders square but allows the girders to flex as shown in Fig. 2ᵇ or with a slight flexure in the bottom flanges as the trucks at each end of the same girder follow the inequalities of their respective rails.

Since a turntable must be centered for turning and is usually partially supported at K, it is essential that the girders be connected by cross frames or heavy diaphragms from flange to flange and web to web immediately above K and this cross bracing modifies the line about which the oscillating trucks may flex the bottom or tension flanges of each end of the girders to approximately line A'—B' (see Fig. 1). Likewise for very long span turntables it is found preferable to interpose other full depth cross frames as $d'$ between said girders, and the central portion of the turntable then becomes a rigid non-flexible box and the portion $a$—$x$—$y$—$z$ as shown in Fig. 1 cannot be made to flex and the flexing limit then approximates the line A—B. This limit, even though inclined, allows ample adjustment so that the trucks may equalize their wheel loads on the rail particularly since the wheel-rail contact is a moving contact allowing of slight end-wise-of-table adjustment. It is evident that the flexing stresses set up constantly assist to return the trucks to normal or first adjusted position and that the axle bearings must be such as will take and transmit to the axles and wheels certain end thrusts in both directions.

It is thus evident that the horizontal plane bracing as $a$—$a$—$a$ together with the depth transverse bracing as $d$ and $d'$ while fulfilling its primary function of properly bracing a turntable, can be so placed as to allow the truck frames built rigid with the ends of the girders to so oscillate as to equalize their girder loads on the two wheel to rail contacts. It is also evident that such flexing induces flexural stresses practically nil at $b$—$b$ where the motion is small to a maximum in the bottom flange near A, and that such stresses must be provided for in the design by special details for the top bracing connections and by adopting a rather narrow bottom flange at A.

The application of similar construction to a cross tie deck turntable as in Fig. 2 with top bracing between the girders, $a$—$a$—$a$ and cross frames $d$ and $d'$ gives a similar limit of flexure A—B and the trucks will oscillate about $b'$—$b'$, Fig. 2ª. This truck motion makes the girders swing as in Fig. 2ᵇ and the unbraced part of the girders built into the trucks proper is further strengthened by a non-shear or link connection of the truck to the truck opposite and in line with the top bracing as at L in Fig. 2ª.

Variations as to the location of the limit of flexing are controllable by this method of table construction though such variations are not preferred for deck transfer or turntables for the obvious reason of the considerable girder flange motion immediately under the cross ties where a medium limit variation is shown in Fig. 3 where the horizontal bracing $a'$—$a'$—$a'$—$a'$ and frames $d'$ together with a non-shear connection of trucks at L in Fig. 3ª insures a limit of flexing C—B—A; that is, the unbraced top and bottom flanges of the girders assume motions about $b^2$ as shown in Fig. 3$^b$. Similarly, a bottom limit variation is shown in Fig. 4 where the horizontal bracing $a^2$—$a^2$—$a^2$—$a^2$ and cross frame $d'$ together with the non-shear connection of trucks at L in Fig. 4$^a$ insures a limit of flexing A—B, and that the unbraced top flanges of girders take positions about $b^3$ as shown in Fig. 4$^b$ which though inapplicable to deck table uses might be exactly that construction preferred for a "through" type construction of table, bridge or other crane.

Therefore, from this preliminary description, it will be apparent that the axis of flexure in the ends of the girder may be located according to the type of table desired by placing the cross bracing at the desired point.

By way of contrasting the foregoing novel features of the present invention with the prior practice, Figures 5 and 5$^a$ illustrate an old type of three-point supported turntable. This construction is of the rigid end type and utilizes rigid full depth cross frames $d$. The top and bottom bracing $e$ and $f$ respectively also preferably are rigid. Each main girder end is mounted on a two-wheeled equalizing truck $g$, and one truck at each end of the unit is extended to receive the motivating power unit $h$ thereon to drive one of the truck wheels and hence the turntable. In cranes and transfer tables, like construction is now in use except that the center centering and part-load-carrying device $j$ is omitted and the crane rails are made parallel with the axles set square with the unit.

For the purpose of disclosing the detail features of construction of a turntable, or the like, embodying the features of this invention, the preferred form of unit, which is shown in Figs. 1 and 1$^a$ is illustrated in detail in Figs. 6 to 10 inclusive. In these figures, the main girders G are illustrated as extending the full length of the unit and including webs 10 having the bottom chords 11. The main girders are connected by struts 12 (preferably of the beam type) which extend between the main girders and at 12$^b$ cantilever laterally outwardly a sufficient distance to support the wide deck. These struts are eliminated at the ends of the main girders for permitting desired flexing of the latter. Bracing angles 12$^a$ are employed for connecting the struts 12 and 12$^b$ to the main girders.

The entire top of the table is covered with a steel plate 14 which provides the top bracing $a$—$a$ in Fig. 1. This steel deck plate determines the axes of flexure $b$—$b$ in Fig. 1$^a$. It will be apparent that the deck plate protects from water, coal, cinders and general deterioration the entire table and machinery located therebelow. Located directly over the main girders G and resting on the top flanges thereof are the deck track rails 15 employed for rolling stock. The rails are secured in place by suitable clips 15$^a$.

Figures 6 and 8 disclose the supporting trucks for the girders G. Each girder is provided with a fabricated truck including a wheel 16 located on each side of the web of the girder. Each wheel is mounted upon a radial axle 17 supported by bearings 18 mounted in a box structure 19. The positioning of these axles and wheels approximately equal distances on each side of each main girder will double the capacity of a table as compared to tables having one wheel for each main girder for the same capacity of rails and foundations which are usually the limiting factor. These truck structures are assembled, exactly alined and then made rigid or integral with the girders by welding so that substantially the bearings, wheels, and axles as well as the side frames, top plates or bottom plates of the boxes 19 may be easily assembled with all features of alinement retained, the said side frames, wheels, axles, bearings, boxes, etc., being interchangeable in accordance with the invention set forth in my application, Serial No. 221,120, filed Sept. 21, 1927. The inside boxes of the trucks are joined at the center with the machined connection 19$^a$ which will allow of relative vertical motion and still will take care of relative push and pull between the trucks.

There is intended to be mounted upon the rigid portion of the turntable unit, that is inwardly of the strut 12 disclosed in Fig. 6, a prime mover, not shown, which is connected to a shaft 20 supported by bearings 21. This rigid shaft section 20 is connected by the shaft section 22 and flexible couplings 23 to one of the axles 17. This flexible drive will permit of the end portions of the main girders flexing to take care of the usual inequalities in the alinement and level of track rails.

From the strut 12 shown in Fig. 6 to the adjacent end of the turntable unit, the main girders are permitted to flex and for this reason no deep struts are provided. Figures 6 and 9 show small plate supporting beams 24 which extend between the main girders and also laterally thereof. These beams are located on the underside of the deck plate 14 and are connected to the inverted U-shaped plates 25, which are hung over the girders G, by connection angles 26.

The outer truck frames are extended at 40, see Fig. 8, to cooperate with the laterally extending end portions of the struts 12$^b$ and beams 24 to make a wide walkway.

Figures 6 and 7 disclose side stringers 28 which are flexibly connected to a wheel box, as at 29, at one end and similarly connected to a cross girder, as at 30, at its remaining end. There are four of these stringers, two at each end of the turntable. Relatively shallow cross beams 31 are provided for these stringers and cooperate therewith to take vertical load at each end of the table, thus providing an engine wheel receiving platform so that if the table is not set exactly right and an engine truck drops off of the rails on the table deck, the truck will be supported first by the wheel boxes which are stable, and secondly by the side stringers. It will be noted that the small beams 31 are welded to the deck plate and include small sections extending between the adjacent flanges of the girders and additional sections extending outwardly from the girders to rest upon the top flanges of the stringers 28.

The deck plate is covered with cushioning timber planks 32 to receive flanges of the derailed wheels. The planks 33 extend lengthwise of the turntable and are supported upon the struts 12$^b$, the truck extensions 40, and beams 24, see Fig. 8, for forming walkways. Suitable hand rails 35 are provided along the outer-sides of these walkways.

Figure 9$^a$ discloses a modification over the structure illustrated in Fig. 9. It will be noted in this view that the small beams 24$^a$ are connected to the girders by the rolled channels 25$^a$ instead of the bent plates 25 shown in Fig. 9. The retainers for the tracks 15 consist of clips 15$^b$ having wedges 36 between the base flanges of the tracks and the said clips.

The turntable, or the like, of course is located in a suitable pit 37 having the stepped formation 38 for supporting the rail 39.

Figure 1$^b$ shows the end of a construction for a bridge crane in which case the main girders G' are box girders and require no staying transversely from girder to girder (which allows the trolley and trolley tackle to operate therebetween) and here the girders flex an average of half their length and need only be top braced at their ends to hold the girders square and to determine the axis of flexure f'.

In Figures 2 and 2$^a$ a turntable is illustrated which embodies the same characteristics of the turntable or similar structure illustrated in Figs. 1 and 1$^a$, with the exception that the top plate or deck 14 is not used and the usual cross-tie deck of wood or steel 14' is provided which allows of spreading the main girders G from ordinary track gauge width to any desired width, particularly greater widths. This construction necessitates the substitution of a top bracing system along the line a—a, and deep transverse frames d, in place of the deck plate 14. This construction allows of the main girders flexing below the line A—B and again the center line of the top flange of each girder becomes the approximate axis of flexure, as at b' in Figs. 2$^a$ and 2$^b$.

In the forms shown in Figs. 3, 3$^a$, 3$^b$, 4, 4$^a$ and 4$^b$ the top plate or equivalent bracing illustrated in Figs. 6 to 10 inclusive is dropped to about the center line of the girder webs in one form and to the bottom flanges of the girders in the second form. The axis of flexure is shifted in each case in accordance with the location of the line of bracing.

Without further description it is thought that the features and advantages of the invention will be readily apparent to those skilled in the art, and it will of course be understood that changes in the form, proportion and minor details of construction may be resorted to without departing from the spirit of the invention and scope of the appended claims.

I claim:—

1. A movable structural span of the class described including main load supporting members, and transverse bracing means for said members which are located with respect to the depths of the latter so as to permit relative flexing of parts of said members about predetermined axes of flexure.

2. A movable structural span of the class described including main girders, means for bracing the intermediate parts of the girders against flexing while leaving the ends thereof free to flex, and means for bracing said free ends located with respect to the depths of the girders so as to determine an axis of flexure.

3. A movable structural span of the class described including main girders, struts connecting the intermediate parts of said girders, and a line of bracing connecting the ends of the girders located with respect to the depths of the girders so as to determine an axis of flexure.

4. A movable structural span of the class described including main girders, struts connecting the intermediate portions of the girders, and a deck plate extending the full lengths of the girders and bracing the ends of the girders with respect to each other so as to determine an axis of flexure.

5. A movable structural span of the class described including a pair of main girders, a deck plate extending the full length of the girders and connected thereto, and deck track rails mounted upon the deck plate in vertical alinement with the main girders.

6. A movable structural span of the class described including a pair of main girders extending the full length of the span, transverse frames connecting the intermediate portions of the girders to prevent relative flexing thereof, a deck plate extending the full length of the girders and mounted thereon, and a two-wheeled two-axled truck connected to each end of each girder.

7. A movable structural span of the class described including main girders, a deck plate extending the full length of the girders and connected thereto, deck track rails mounted upon the deck plate, and wheeled truck mountings for the ends of the girders.

8. A movable structural span of the class described including main load supporting members, transverse bracing means for the intermediate portions of the members to prevent relative flexing thereof, a line of bracing for the end parts of the members located with respect to the depths of the girders so as to determine an axis of flexure, wheeled trucks connected to the ends of the girders, and means for moving the span which includes driving means carried by the non-flexible portion of the span, and a flexible connection between the driving means and one of the wheels of said trucks.

9. A movable structural span of the class described including main girders extending the full length of the span, frames connecting the intermediate parts of the girders to prevent relative flexing thereof, a deck plate extending the full length of the girders and connected thereto, the said deck plate determining an axis of flexure for the end parts of the girders, a two-wheeled two-axled truck for each end of each girder, and a drive connection for one of said wheels extending to the non-flexible intermediate portion of the span and having flexible couplings for compensating for the relative movement of the ends of the girders with respect to the intermediate parts thereof.

10. A movable structural span of the class described including a pair of main girders, a deck plate connected to the top flanges of said girders, deck track rails mounted upon the deck plate directly over the girders, and a de-railed wheel supporting platform at each end of the span.

11. A movable structural span of the class described including a pair of main girders, a deck plate connected to the top flanges of said girders, deck track rails mounted upon the deck plate directly over the girders, and a de-railed wheel supporting platform at each end of the span, said de-railing platform including auxiliary transverse supporting members for the deck plate and longitudinally extending stringers for the supporting members.

12. A movable structural span of the class described including a pair of main girders, a two-wheeled two-axled truck mounted on each end of each girder, frames connecting the intermediate portions of the girders, a deck plate overlying the girders and connected thereto, side stringers positioned on the outside of the ends of the girders, means for engaging the stringers to the girders at one end, means for connecting the stringers to the trucks at their other ends, and transverse bracing means for the stringers.

13. A movable structural span of the class described including a pair of main girders, wheeled trucks for the ends of each girder, a deck plate extending the full length of the girders and connected thereto, and planks overlying the deck plate.

14. A movable structural span of the class described including a pair of main girders extending the full length of the span, beams connected to and bracing the intermediate portions of the girders and cantilevered outside of the girders to support a walkway, framed trucks connected to the ends of the girders, the outer frames of said trucks being extended laterally to support the ends of walkways, and planks mounted on said beam cantilevers and said truck frame extensions for forming said walkways.

15. A movable structural span of the class described including a pair of main girders, frames rigidly connecting the intermediate parts of said girders, decking covering the full length of the span, the said decking forming a line of bracing for the ends of the girders to permit the said ends to flex about a predetermined axis, and two-wheeled truck frames rigidly attached to the ends of the girders.

16. In combination with a pit having a track rail mounted therein, of a movable structural span positioned in said pit and including a pair of main girders, bracing means for the intermediate parts of said girders to prevent relative flexing, other bracing at the ends of the girders for determining an axis of flexure for the said ends, and two wheeled truck frames rigidly attached to the ends of the girders and engaging the rail so that as the wheels follow the inequalities of the rail their trucks will flex the ends of the girders about their axes of flexure to equalize the girders' loads to said rail.

In testimony whereof I hereunto affix my signature.

MEIER G. HILPERT.